United States Patent [19]
Cinotti

[11] Patent Number: 5,092,448
[45] Date of Patent: Mar. 3, 1992

[54] EQUIPMENT FOR STACKING LAYERS OF CYLINDRICAL COMMODITIES SUCH AS ROLLS OF PAPER IN READINESS FOR TRANSFER TO A WRAPPING MACHINE

[75] Inventor: Andrea Cinotti, Bologna, Italy

[73] Assignee: Pemco Company, Inc., Sheyboygan, Wis.

[21] Appl. No.: 581,207

[22] Filed: Sep. 11, 1990

Related U.S. Application Data

[63] Continuation of Ser. No. 279,913, Dec. 5, 1988, abandoned.

[30] Foreign Application Priority Data

Jul. 29, 1988 [IT] Italy .................................. 3559 A/88

[51] Int. Cl.$^5$ ............................................. B65G 57/32
[52] U.S. Cl. ................................. 198/418.4; 53/152; 414/791
[58] Field of Search .................... 53/152, 154, 540; 198/418.4, 418.5, 447; 414/789.6, 791, 791.1, 790.3

[56] References Cited

U.S. PATENT DOCUMENTS

| | | | |
|---|---|---|---|
| 3,455,085 | 7/1969 | McIntrye | 198/418.4 X |
| 4,235,329 | 11/1980 | Crawford et al. | 414/790.3 X |
| 4,450,949 | 5/1984 | Buschor et al. | 198/418.4 |

Primary Examiner—Robert J. Spar
Assistant Examiner—Janice Krizek
Attorney, Agent, or Firm—Laff, Whitesel, Conte & Saret

[57] ABSTRACT

Rolls of paper are stacked in layers without any relative movement occurring between the surfaces brought into contact, using a transfer table which pivots about a horizontal axis, such that the end directed toward the wrapping machine can be swung vertically into different positions corresponding in number with the number of layers to be wrapped and matched in height with a set of tiered stacking tables, the lowest of which is also the longest; with each stacking table occupied by one layer of the paper rolls, the several layers move forward as one, in vertical alignment, to the point where the top layers run off the ends of the shorter tables together and each roll settles plumb on the roll beneath.

7 Claims, 2 Drawing Sheets

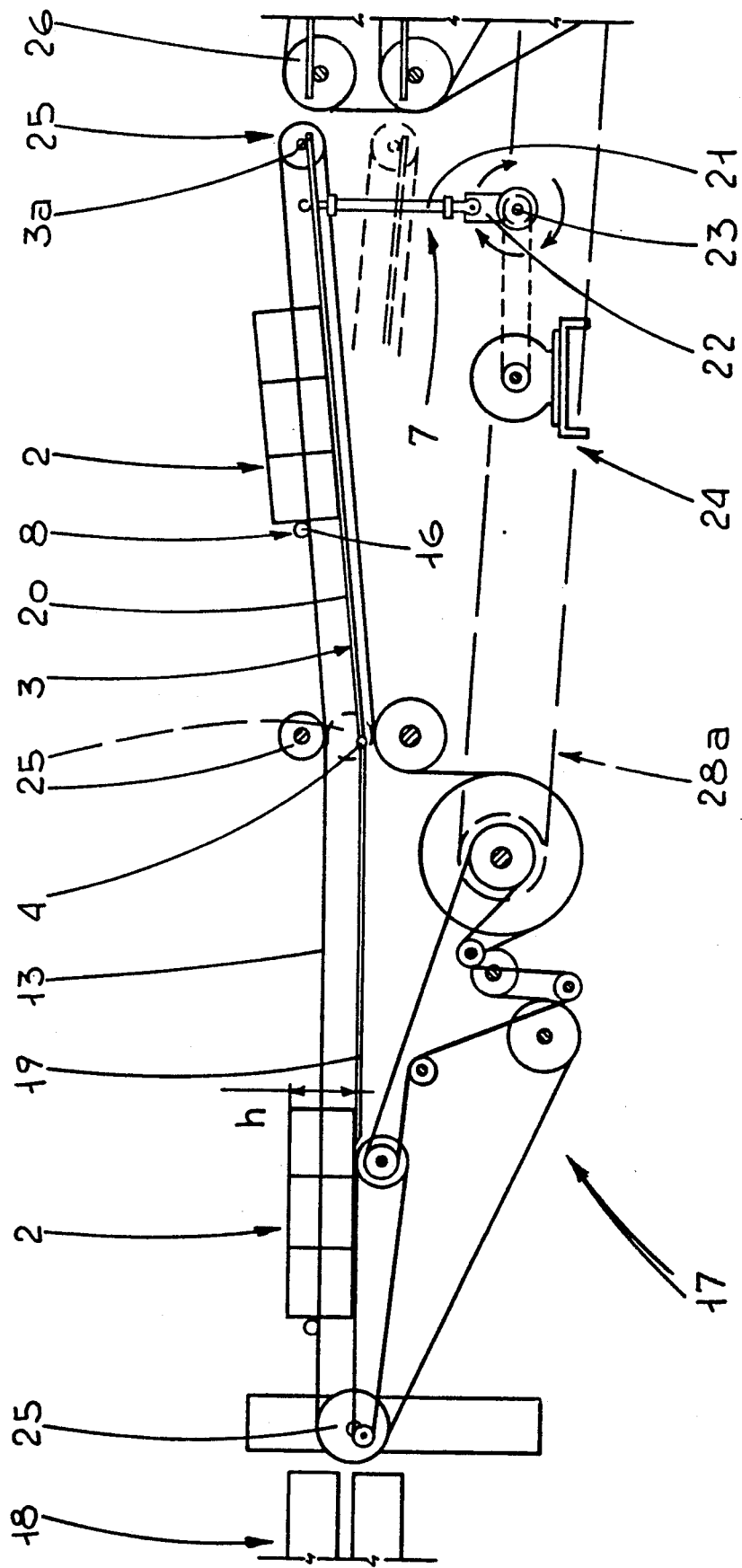

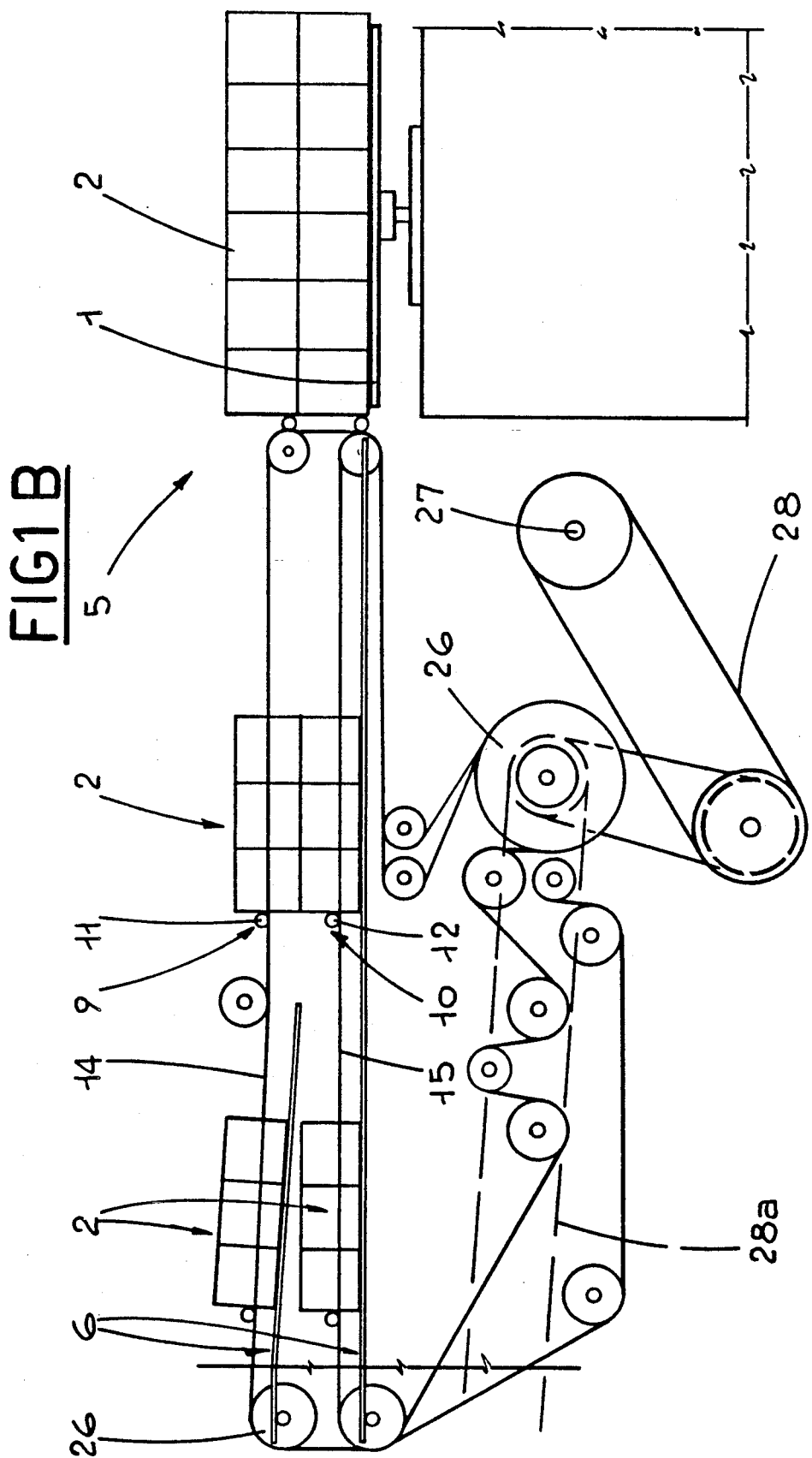

EQUIPMENT FOR STACKING LAYERS OF CYLINDRICAL COMMODITIES SUCH AS ROLLS OF PAPER IN READINESS FOR TRANSFER TO A WRAPPING MACHINE

This application is a continuation of application Ser. No. 07/279,913, filed Dec. 5, 1988, now abandoned.

BACKGROUND OF THE INVENTION

The present invention relates to equipment by which cylindrical commodities are stacked automatically in layers, a typical though by no means exclusive application being the preparation of rolls of paper for transfer to a wrapping machine.

Conventionally, cylindrical commodities such as rolls of paper are often packaged in layers, the single items of one layer making contact with those directly above or beneath along a common straight line cylindrical generator.

One current packaging method substantially involves ordering the commodities into layers by means of an indexing platform which is lowered through a number of positions separated one from the next above by a distance not less than the height of one layer.

With the single layers supplied to the platform at the same height, the platform is indexed on receipt of each layer to the next position, moving downward until the number of layers accumulated matches that required to complete the package.

Thus, with the exception of the first layer, which rests directly on the platform, each successive layer will be stacked directly on top of the layer previously positioned. Given that the layers remain stationary once taken onto the platform, however, one necessarily has a sliding contact between the layer uppermost and the next layer received; this represents a drawback, as the surfaces in contact suffer mutual damage, and the greater the friction generated between the layered commodities (which is naturally high in the instance of paper rolls), the greater will be the extent of such damage.

Accordingly, the object of the invention disclosed is to embody equipment that will stack layers of cylindrical commodities without occasioning sliding contact between one commodity and another.

SUMMARY OF THE INVENTION

The stated object is fully realized, according to the invention, with equipment comprising a first table that is pivoted about a transverse axis in such a way that the end from which the commodities run out can be swung vertically through a number of transfer positions matching the number of layers to be wrapped together, and a set of tiered stacking tables each of which receives commodities from the first table at a corresponding transfer position.

The equipment further comprises drag chains which, in the case of the stacking tables, are designed to convey the layers forward in vertical alignment; accordingly, as each layer runs off the relative stacking table, the single commodities come to rest cleanly on those of the layer beneath, and both layers continue forward together at the same speed.

Among the advantages afforded by equipment embodied according to the invention is that it can perform the additional function of providing a flow take-up facility between one or more paper manufacturing machines and a downstream wrapping machine by which the stacked layers of commodities are packaged; in effect, wrapping machines of the type in question will almost invariably be slower in operation than the production line machinery.

BRIEF DESCRIPTION OF THE DRAWINGS

The invention will now be described in detail, by way of example, with the aid of the accompanying drawing, which is divided into two figures, 1a and 1b, and provides a schematic side elevation of the equipment disclosed located between a first machine by which the commodities are supplied in single layers, and a second machine by which the stacked layers are wrapped.

DESCRIPTION OF THE PREFERRED EMBODIMENTS

With reference to the drawing, equipment according to the invention, denoted 17 in its entirety, would be exploited to interconnect a first machine 18, from which commodities run out in single layers 2 on one level, and a machine 5 by which the layers are collected and wrapped.

Located along the path between the two machines 18 and 5, the equipment 17 comprises a transfer table denoted 3 and a plurality of tiered stacking tables denoted 6. The transfer table 3 is able to pivot about a transverse axis 4, located at a given point substantially mid-way along its length, such that the end directed toward the wrapping machine 5 is variable in height.

The example of the equipment illustrated assumes a situation in which two layers 2 only are stacked one on top of the other, though clearly enough, no limitation of the number of tiers is implied. 19 denotes the section of the transfer table 3 that lies between the runout of the supply machine 18 and the pivot axis 4, which is supported in fixed position by a bearing structure (not illustrated) on the same level as that on which the layers 2 of commodities are conveyed from the machine 18.

20 denotes the pivoted section of the transfer table 3, the projecting end 3a of which associates with lift means 7 consisting in a rod 21 hinged at one end to the underside of the pivoted section 20, and at the remaining end, to a crank arm 22 which is keyed onto a shaft 23 set in rotation by a motor denoted 24. The length of the crank arm 22 will be greater than half of the height ('h' in FIG. 1a) of the layer 2 of commodities, in such a way that the distance separating the two limit positions assumed by the projecting end 3a of the pivoted section 20 is greater than the height h of the layer 2, for a reason that will shortly become evident.

8 denotes means by which the single layers 2 of commodities are conveyed along the length of the transfer table 3; such means consist in a pair of chain loops 13, passed around relative drive, guide and return sprockets 25, the uppermost branches of which are disposed parallel with each other and with the table 3. It will be seen from FIG. 1a that the sprockets 25 above and below the pivot axis 4 also provide a fulcrum at their point of contact with the chains 13, enabling the chains to move as one with the relative section 20 of the table. The chains 13 extend along each side of the transfer table 3 and are interconnected by a plurality of transverse bars 16 spaced regularly along the loop at a nominal distance that will take account of the maximum length of one layer 2 of commodities.

The stacking tables 6 are incorporated in a number matching the number of layers 2 to be wrapped; more exactly, the tiered tables are aligned vertically with the bottom table of their number, which is longer than the remainder and occupies a position substantially on a level with the platform 1 of the wrapping machine 5.

However many stacking tables 6 are installed, each will depart from one of the stable limit positions assumed by the mobile end 3a of the transfer table, the bottom table 6 extending farther to terminate in close proximity to the platform 1.

The upper stacking table 6 (or tables, in equipment with more than two) converges gently toward the wrapping machine 5, at any rate, down to a minimum height H from the table below that is not less than the height of one layer h.

Each stacking table 6 is provided with respective conveyor means 9, 10 incorporating drag bars 11, 12 that are vertically aligned, and remain vertically aligned when in movement, at least when in transit above the level of the relative table 6. Like the means 8 aforementioned, these conveyor means 9 and 10 also consist in paired chain loops 14 and 15 passed around drive, guide and return sprockets 26 at either side of the relative table 6. The length of the top branch of the chain loop 14 serving the upper table 6 substantially matches that of the top branch of the loop 15 serving the bottom table, so as to ensure that the top layer 2 of commodities is conveyed positively forward, even having left the relative table 6 and come to rest on the layer 2 beneath, and to avoid any possibility of a layer 2 colliding with a bar 11 descending in its path.

As in the case of the transfer table chains 13, each pair of loops 14 and 15 will be interconnected transversely by the drag bars 11 and 12 at regular intervals calculated to accommodate the maximum envisaged lengths of a single layer 2.

In a preferred embodiment of the equipment, the two chain loops 14, 15 will be driven from a shaft 27 of the wrapping machine 5 by way of a transmission denoted 28. To ensure synchronized operation of the various conveyor means 9, 10 and 8, the chain loops 13 of the transfer table will also be driven by way of a take-off 28a from the same transmission 28; more exactly, the drive ratios will be calculated such that the conveying speed of the transfer chain loops 13 is a multiple of the speed of the stacking chain loops 14 and 15, at least equal numerically to the number of the layers 2 of commodities that are to be wrapped together.

Commodities are ordered previously by the supply machine 5 into layers 2, which run onto the fixed section 19 of the transfer table 3. Operating in time with the machine 18, the drag bars 16 locate behind the layers 2 in regular succession and drag them along the table 3, while the motor 24 turns the crank arm 22, operating in time with the drag bars 16 in such a way that the lift means 7 will be at their top or bottom dead center and remain there whenever a layer 2 is transferred from the pivoted section 20 of the transfer table 3 to the relative stacking table 6. Once both stacking tables 6 are occupied by a layer 2 of commodities, the drag bars 11 and 12 of the relative conveyor means 9 and 10 will operate, still in time with the bars 16 of the transfer table 3, to carry both layers forward at the same speed, and in vertical alignment.

At a given point, the upper layer 2 will run off the end of the relative table 6 and settle gently onto the layer 2 occupying the table 6 beneath, with no sliding contact occurring between the two; indeed there will be no relative movement whatever between the two layers 2, as both continue to advance at the same speed toward the wrapping machine 5.

What is claimed:

1. A paper roll stacking apparatus for stacking layers of paper rolls, supplied in a single layer by a rolling machine and conveying them to a wrapping machine comprising:

a transfer table positioned relative to the rolling machine to receive single layered rolls of paper, said transfer table having a horizontally fixed first portion and a pivoting second portion having one end pivotally connected adjacent the fixed portion;

a first conveyor means connected to said transfer table first and second portions to convey single layered rolls along said transfer table;

said first conveyor means comprising a pair of looped chains with said transfer table disposed therebetween, a portion of said looped chains being positioned above said transfer table, a plurality of spaced transfer bars interconnecting said pair of looped chains with at least one of the transfer bars being above said transfer table to move said paper rolls along said transfer table;

a plurality of vertically spaced stacking tables equal in number to a number of layers to be stacked and wrapped, a first stacking table being at the same level as a wrapping machine platform, said first stacking table being disposed below at least one other stacking table, said first stacking table having a length longer than said at least one other stacking table, said other stacking table converging towards said first stacking table and said stacking tables being spaced a predetermined distance apart, said at least one other stacking table having a length sufficient to support one layer of paper rolls, said layer of rolls being at least two side-by-side single rolls of paper, each of said stacking tables having one end positioned adjacent the other end of said transfer table second portion to receive one layer of paper rolls from the transfer table second portion;

lifting means connected to said transfer table second portion to pivot the other end of said transfer table second portion to each stacking table as desired wherein said one layer of paper rolls are delivered from said transfer table second portion to each stacking table in a predetermined manner;

a plurality of stacking table conveyor means, one for each vertically spaced stacking tables, each of said stacking table conveyor means being operable independently of the first conveyor means, said stacking table conveyor means being synchronized with the first conveyor means to move each layer of paper rolls on the first and at least one other stacking tables wherein the layer of paper rolls on the at least one other stacking table is moved so as to be stacked onto the layer of paper rolls on said first stacking table, the length of said first stacking table being such as to accommodate at least two layers of paper rolls spaced in the direction of conveyance by the stacking table conveyor means;

said first stacking table being positioned with its other end adjacent the wrapping machine platform to deliver the stacked paper rolls to said platform.

2. The apparatus of claim 1, wherein the at least one other stacking table converges gradually toward the first stacking table so that each table is separated from a table above or below by a distance not less than the height of one layer of the paper rolls.

3. The apparatus of claim 1, wherein said fixed first portion and said pivoting second portion of said transfer table have approximately the same length.

4. The apparatus of claim 1, wherein said stacking table conveyor means consist of respective pairs of parallel chains interconnected by tranverse rods.

5. The apparatus of claim 1, wherein said first conveyor means are driven at a speed which is a mutiple of the speed of said stacking table conveyor means.

6. The apparatus of claim 1 wherein the transfer table is free of U-shaped guard rails to hold said paper rolls.

7. The apparatus of claim 1 wherein the stacking table conveyor means comprises a pair of stacking table looped chains for each stacking table with each pair of stacking table looped chains having a portion thereof above each respective stacking table , a plurality of spaced drag bars interconnecting said pair of stacking table looped chains, said drag bars when above their respective stacking table being vertically aligned with each other.

* * * * *